UNITED STATES PATENT OFFICE.

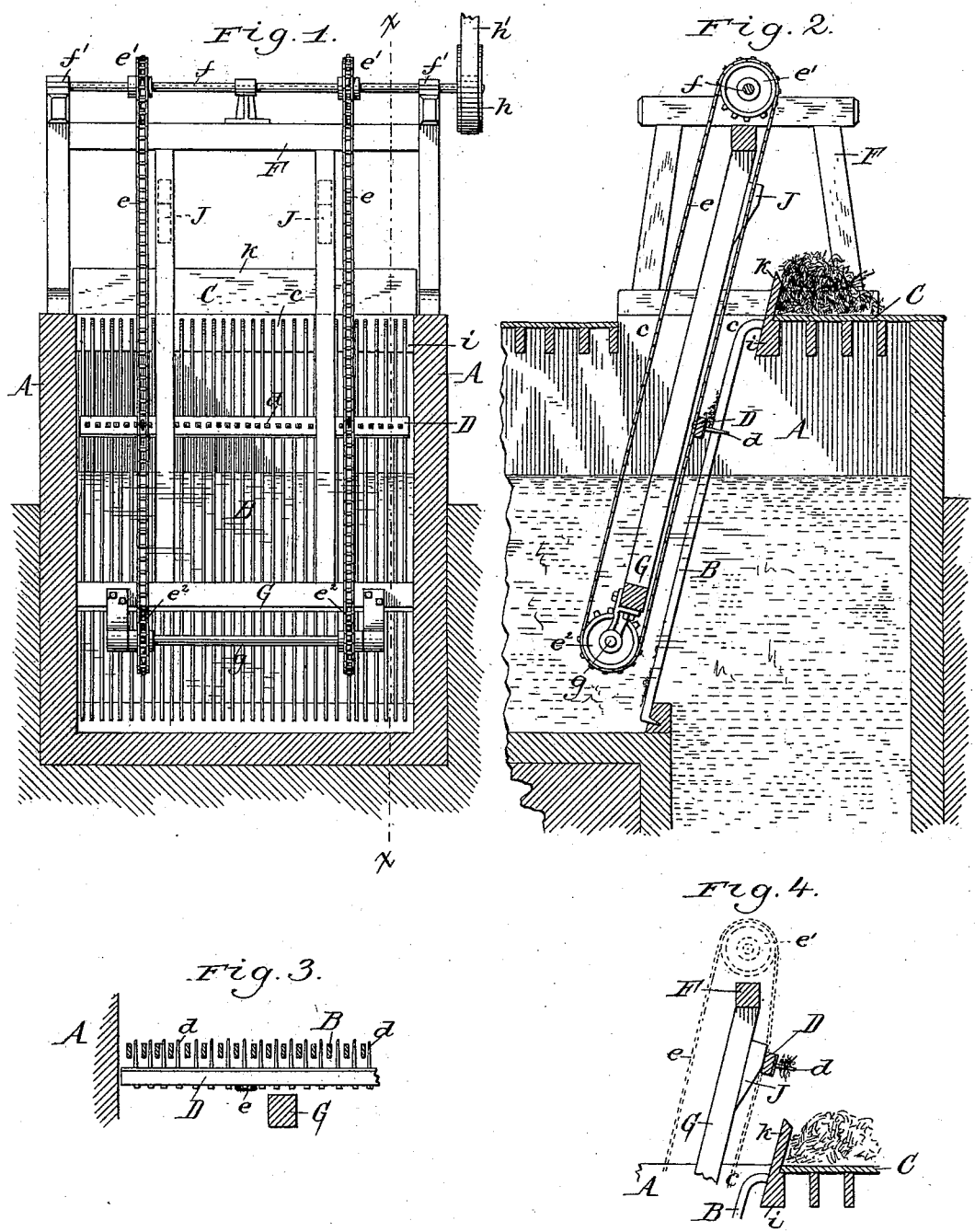

CHARLES RAKES AND JOSEPH H. EILERS, OF LOCKPORT, NEW YORK; SAID EILERS ASSIGNOR TO SAID RAKES.

DEVICE FOR CLEARING THE GRATINGS OF MILL-RACES.

SPECIFICATION forming part of Letters Patent No. 414,887, dated November 12, 1889.

Application filed February 2, 1889. Serial No. 298,467. (No model.)

*To all whom it may concern:*

Be it known that we, CHARLES RAKES and JOSEPH H. EILERS, both of Lockport, in the county of Niagara and State of New York, have invented new and useful Improvements in Devices for Clearing the Gratings of Mill-Races, of which the following is a specification.

This invention relates to a device for removing weeds, sticks, and other accumulations from the guards or gratings of mill-races. Heretofore it has been the practice to clear these guards by means of hand-rakes; but this is objectionable because it not only involves considerable time and labor, but is unreliable, as the duty of keeping the grating free from obstructions is liable to be neglected, in which case the passage of the water is more or less obstructed and the water-supply to the water-wheel diminished, which results in a slow and irregular running of the water-wheel and sometimes in its entire stoppage, thereby causing much loss of time.

The object of our invention is to provide simple means whereby the grating is kept free from accumulations at all times without requiring any care or attendance.

The invention consists to that end of the improvements which will be hereinafter fully described, and pointed out in the claims.

In the accompanying drawings, Figure 1 is a transverse section of a mill-race provided with our improvements. Fig. 2 is a vertical longitudinal section thereof in line $xx$, Fig. 1. Fig. 3 is a fragmentary horizontal section of the race, showing the rake in elevation. Fig. 4 is a vertical elevation of the upper portion of the race and adjacent parts.

Like letters of reference refer to like parts in the several figures.

A represents the side walls of the race, and B is the guard or grating arranged in the race and composed of a series of upright parallel bars separated by water-spaces.

C represents a platform arranged above the race, and $c$ is the opening in the platform through which the weeds, sticks, &c., are removed.

D represents a traveling rake, the teeth $d$ of which run in the spaces between the bars of the guard or grating B, and whereby any accumulations lodging against the grating are elevated and deposited upon the platform C. The revolving rake D extends across the entire width of the race and is secured to endless chains or belts $e\ e$, which run around sprocket or guide wheels $e'\ e^2$. The upper sprocket-wheels $e'$ are mounted upon a horizontal shaft $f$, which turns in bearings $f'$, secured to a supporting-frame F, resting upon the top or platform of the race, and the lower sprocket-wheels $e^2$ are immersed in the race and are mounted upon a horizontal shaft $g$, journaled at the lower end of a rectangular supporting-frame G, which is secured with its upper end to the supporting-frame F and extends downwardly into the race through the opening $c$ and is secured at its lower end to the side walls A of the race. The endless belts or chains extend to nearly the bottom of the race, so that the rake will traverse the entire length of the grating.

$h$ represents the driving-pulley mounted on the upper shaft $f$, and to which motion is transmitted from any suitable source by a belt $h'$.

The upper ends of the bars of the grating B are bent at an angle to the body of the bars, as shown in Fig. 2, so as to bring the upper portions of the bars at a short distance from the cross-beam $i$, to which they are attached. This construction enables the teeth of the rake to clear the beam $i$.

J J represent stationary cams arranged above the platform C in the path of the traveling-rake D, and preferably attached to the frame G. As the rake rides up on the inclined faces of the cams J J, it is moved outwardly toward the platform C, as represented in Fig. 4, and in passing over the abrupt upper ends of the cams it is suddenly and quickly drawn inwardly against the frame G by the elasticity of the endless belts or chains $e\ e$, thus jarring the rake. This jarring of the rake causes the weeds, &c., resting upon and adhering to the rake-teeth to be thrown outwardly upon the platform C, from which they are removed from time to time.

A transverse catch-board $k$ is preferably arranged at the inner edge of the platform C, for retaining the deposited weeds upon the platform and preventing the same from falling back into the race. The current in the race tends to move the rake against the bars of the grating and holds the teeth of the latter between said bars.

By our improved device the grating or guard is cleared of weeds, &c., as fast as the same lodge against the grating, thereby always keeping the latter free from obstructions and insuring a regular and uniform flow of the water through the race and the uniform running of the water-wheel.

We claim as our invention—

1. The combination, with the guard or grating of a mill-race, of a traveling endless belt or chain, a rake attached to said belt or chain and traversing said grating, and a jarring device whereby the rake is jarred and the material detached therefrom, substantially as set forth.

2. The combination, with the guard or grating of a mill-race, of a traveling endless belt or chain, a rake attached to said belt or chain and traversing said grating, and a cam whereby the rake is jarred to dislodge the material therefrom, substantially as set forth.

3. The combination, with the race and the platform C, provided with a catch-board $k$, of the guard or grating B, the endless traveling belt or chain running around suitable wheels or pulleys, the rake D, attached to said belt or chain, and the cams J, substantially as set forth.

Witness our hands this 18th day of August, 1888.

CHARLES RAKES.
JOSEPH H. EILERS.

Witnesses:
J. H. BABCOCK,
J. E. EMERSON.